(12) United States Patent
Johnson

(10) Patent No.: US 8,083,028 B2
(45) Date of Patent: Dec. 27, 2011

(54) TRAY FOR TRIPOD DEER STAND

(76) Inventor: David Lawrence Johnson, Ashland City, TN (US)

(*) Notice: Subject to any disclaimer, the term of this patent is extended or adjusted under 35 U.S.C. 154(b) by 770 days.

(21) Appl. No.: 12/141,046

(22) Filed: Jun. 17, 2008

(65) Prior Publication Data

US 2009/0308689 A1 Dec. 17, 2009

(51) Int. Cl.
*E04G 3/32* (2006.01)

(52) U.S. Cl. ............ 182/113; 182/230; 182/151

(58) Field of Classification Search ............ 182/113, 182/151, 230; 160/216, 221; 211/126.15
See application file for complete search history.

(56) References Cited

U.S. PATENT DOCUMENTS

| | | | | |
|---|---|---|---|---|
| 484,418 A * | 10/1892 | Gabriel | ........... | 160/221 |
| 958,857 A * | 5/1910 | Dennis | ........... | 220/8 |
| 1,760,612 A * | 5/1930 | Trott | ........... | 160/216 |
| 2,477,771 A * | 8/1949 | Sanford | ........... | 248/247 |
| 2,704,121 A * | 3/1955 | Maidhof et al. | ........... | 160/216 |
| 3,166,285 A * | 1/1965 | Downes | ........... | 248/245 |
| 3,282,378 A * | 11/1966 | Pierce | ........... | 182/113 |
| 3,513,605 A | 5/1970 | Smith | | |
| 3,519,140 A | 7/1970 | Wellman, Jr. | | |
| 4,036,369 A * | 7/1977 | Eisenberg | ........... | 211/88.02 |
| 4,951,696 A | 8/1990 | Jones, Sr. | | |
| 5,409,081 A | 4/1995 | Reeves | | |
| 5,570,543 A * | 11/1996 | Bishop | ........... | 49/465 |
| 5,927,435 A | 7/1999 | Benton | | |
| D455,585 S * | 4/2002 | West | ........... | D6/511 |
| 6,655,538 B2 | 12/2003 | Saulnier-Matteini | | |
| 7,100,738 B1 * | 9/2006 | Diggle et al. | ........... | 182/9 |
| 2002/0043191 A1* | 4/2002 | Sagol | ........... | 108/193 |
| 2003/0136751 A1* | 7/2003 | Rosenberg et al. | ........... | 211/175 |
| 2007/0089931 A1* | 4/2007 | Hunt | ........... | 182/129 |
| 2007/0296168 A1* | 12/2007 | Dahl | ........... | 280/47.35 |

* cited by examiner

*Primary Examiner* — Katherine Mitchell
*Assistant Examiner* — Johnnie A Shablack
(74) *Attorney, Agent, or Firm* — James Addison Barry, Jr

(57) ABSTRACT

A tray 100 for a tripod deer stand comprising two components 110, 111 wherein the first component 110 includes an inside width 140 that is greater than the second component 111 outside width 143 such that the second component 111 may slide within the first component 110, and wherein the first component 110 is adjusted in relation to the second component 111 to multiple desired overall tray widths 154 between a maximum width FIG. 2C and a minimum width FIG. 2A dependent upon the lengths of the first component 110 and the second component 111. At least two support brackets 160 and hardware 180 are included for securing the first component 110 with the second component 111 for a desired width, for securing the first and second component 110, 111 with the at least two support brackets 160, and for securing the support brackets 160 with the tripod deer stand.

11 Claims, 5 Drawing Sheets

TRAY FOR TRIPOD DEER STAND

FIELD OF INVENTION

The present invention generally relates to a deer stand and more specifically to a tray for a tripod deer stand.

BACKGROUND OF INVENTION

Many outdoor recreational activities require an individual to perch himself well above the ground. In deer hunting, for example, trees frequently provide the best means available to a hunter for avoiding early detection by his prey. Many hunters, photographers, videographers, and other outdoor sports persons use a device commonly known as a tripod deer stand. The tripod deer stand is for a hunter or naturalist to position himself above the ground cover for maximum concealment and optimal visibility. However, there is a need for a tripod deer stand with a tray to allow for convenient storage of various items and equipment.

SUMMARY

A tray for a tripod deer stand comprising two components wherein the first component inside width is greater than the second component outside width such that the second component may slide within the first component, and wherein the first component is adjusted in relation to the second component to multiple desired overall tray widths between a maximum width and a minimum width based on the lengths of the first component and the second component. At least two support brackets and hardware are included for securing the first component with the second component for a desired width, for securing the first and second component with the at least two support brackets, and for securing the support brackets with the tripod deer stand.

BRIEF DESCRIPTION OF THE DRAWINGS

The features, aspects, and advantages of the invention will become better understood with regard to the following description, appended claims, and accompanying drawings where:

DETAILED DESCRIPTION OF THE INVENTION

Figure 1A:
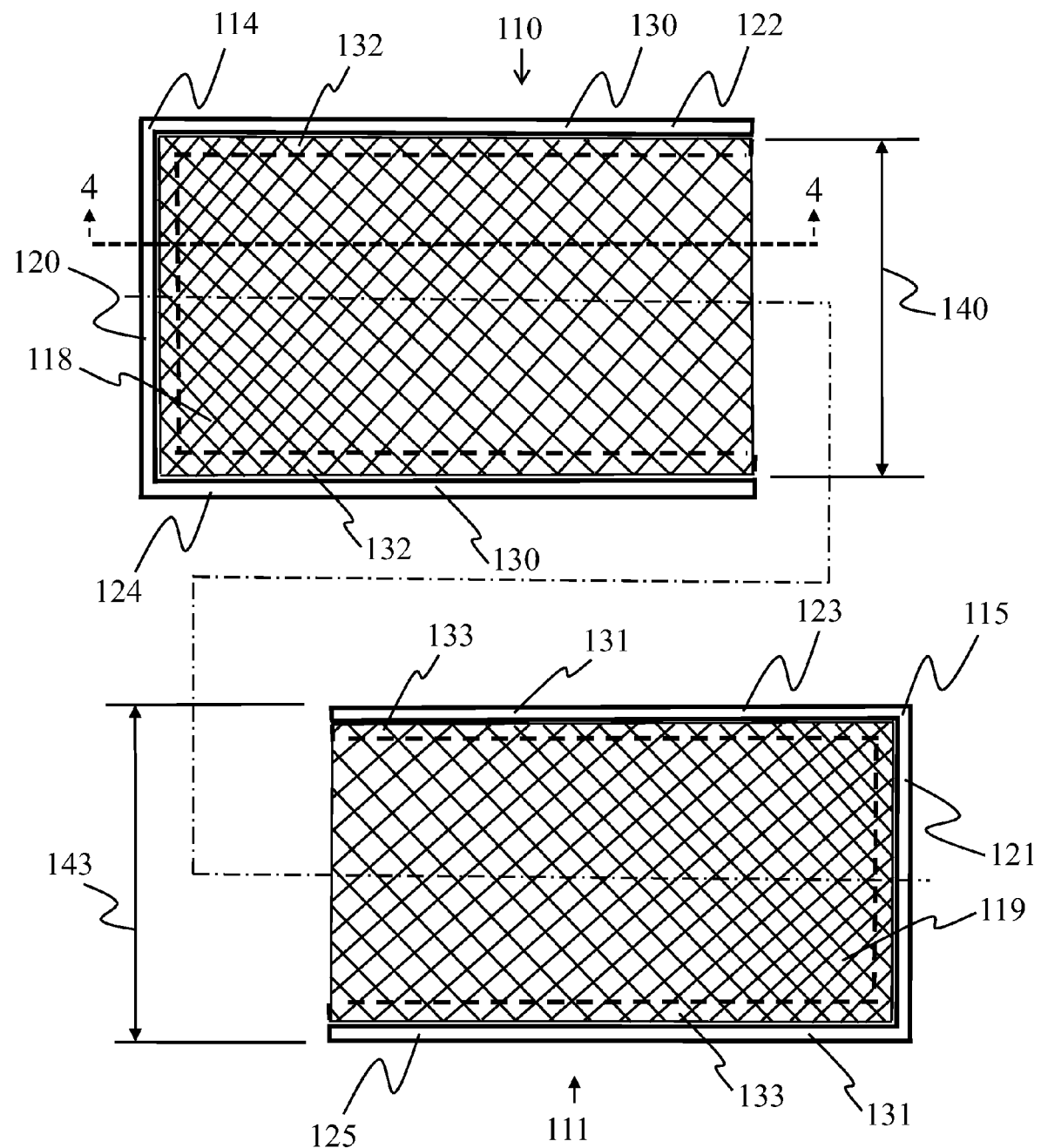
FIG. 1A is an exploded view of a first component and a second component of one embodiment of a tray for a tripod deer stand.
Figure 1B:
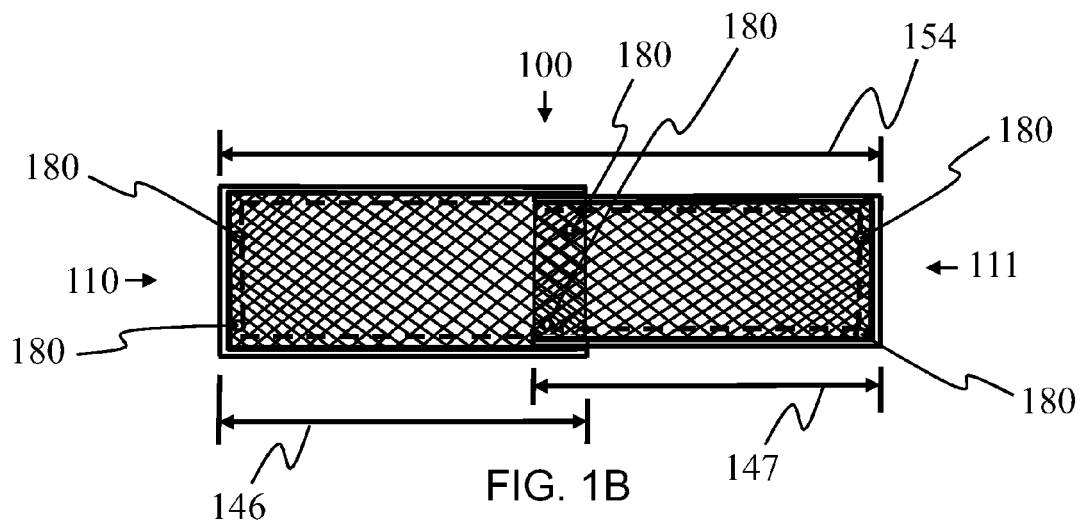
FIG. 1B is a top view of one embodiment a tray for a tripod deer.

The present invention relates to the field of a tray for a tripod deer stand. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

Overview:

As illustrated in FIGS. 1A through 1D, 2A through 2C and 5, the structure of a tripod deer stand tray 100 includes: a first component 110 or a first part of the tray and a second component 111 or a second part of the tray 100. The first and second components 110, 111 each include an inside width and an outside width. The first component inside width 140 is greater than the second component outside width 143 such that the second component 111 may slide within the first component 110 thus allowing overall tray width adjustments between a maximum width FIG. 2C and a minimum width FIG. 2A depending upon the first and second component dimensions. The tray 100 further comprises at least two support brackets 160, and hardware 180 for securing the first component 110 with the second component 111 at an overall desired tray width 154, for securing the first and second components 110, 111 with the at least two support brackets 160, and for securing the at least two support brackets 160 with the tripod deer stand 102. Embodiments of the tray 100 for a tripod deer stand 102 may include an apparatus, and a kit.

Figure 2A:
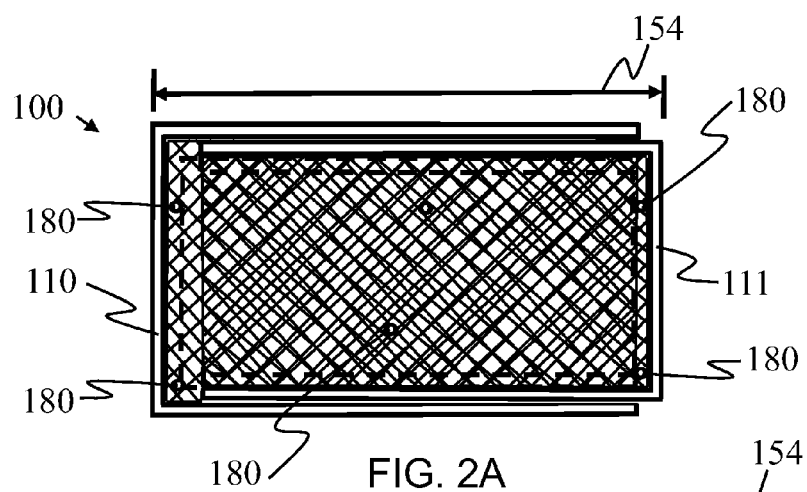
FIG. 2A is a top view of a first component and a second component illustrating a minimum overall tray width of another embodiment of a tray for a tripod deer stand.
Figure 2B:
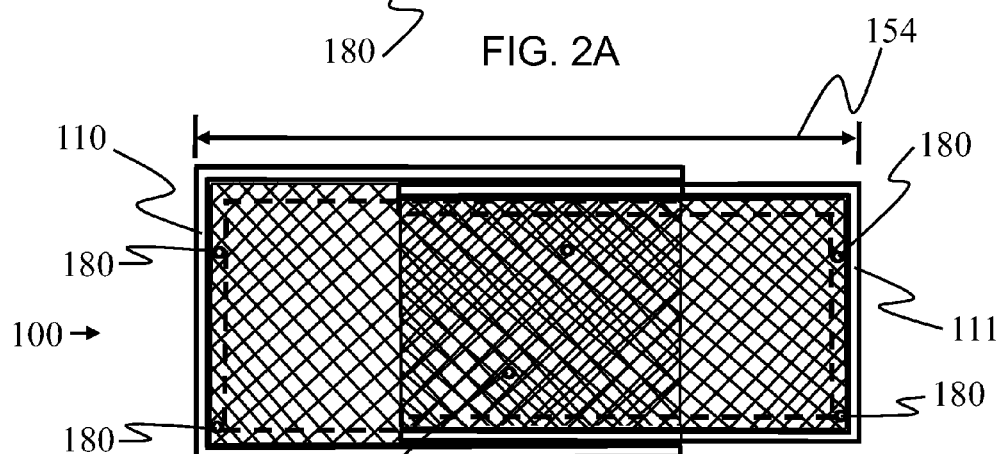
FIG. 2B is a top view of a first component and a second component illustrating an intermediate overall tray width of yet another embodiment of a tray for a tripod deer stand.
Figure 2C:
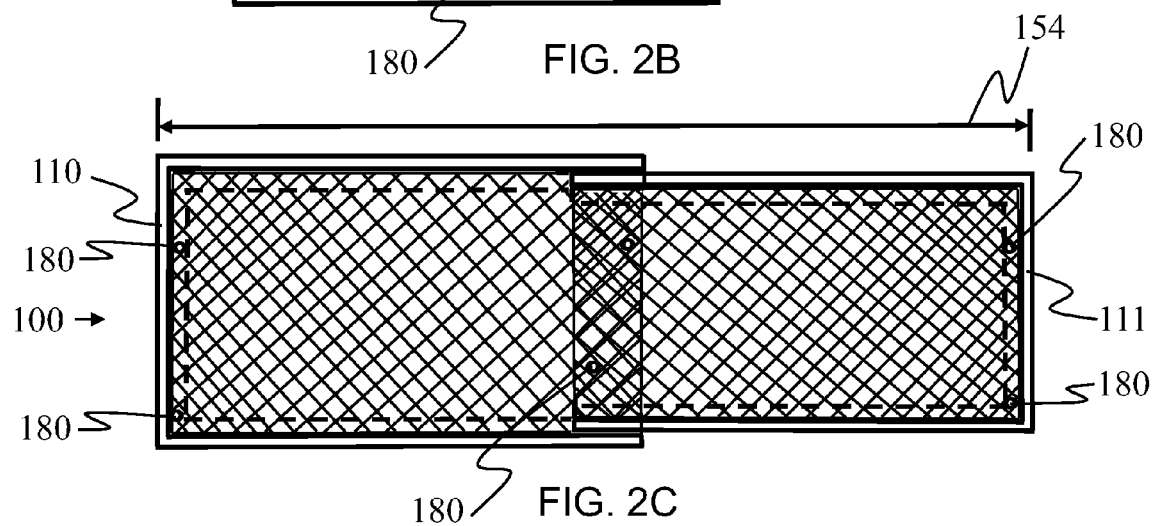
FIG. 2C is top view of a first component and a second component illustrating a maximum overall tray width of an embodiment of a tray for a tripod deer stand.
Figure 3:
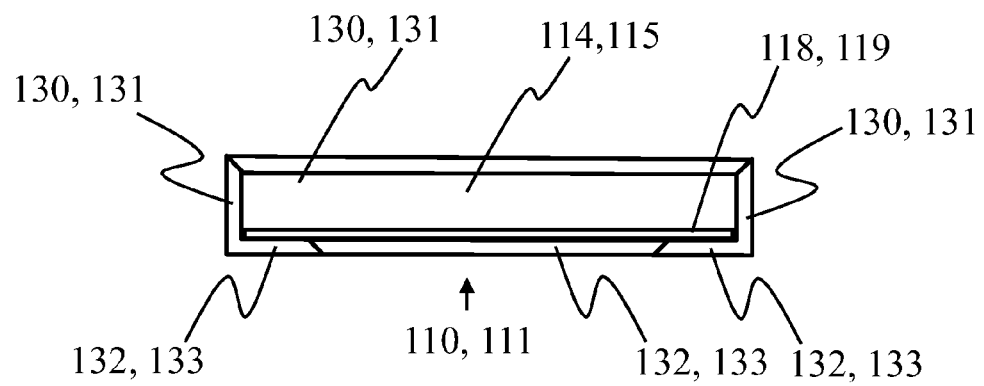
FIG. 3 is an open end side view of one embodiment of a tray for a tripod deer stand illustrating a vertical and horizontal portion of the component frame with a component pan for that embodiment.
Figure 4:
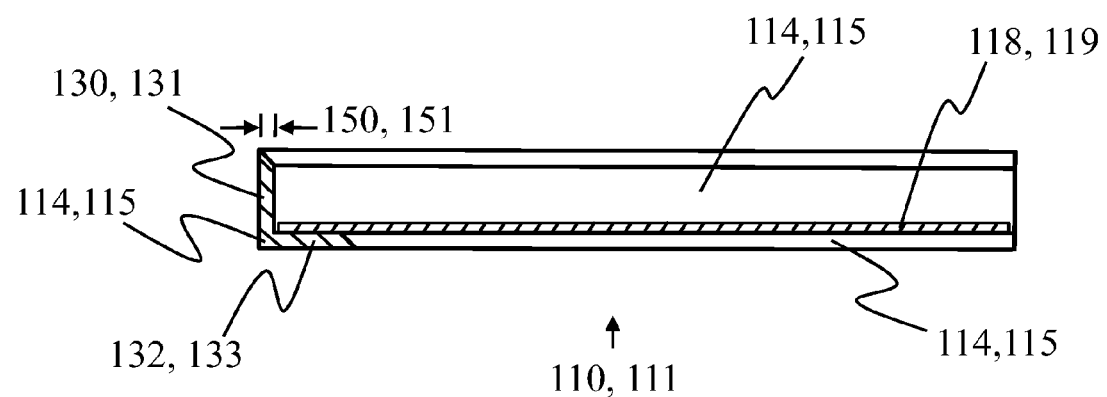
FIG. 4 is a cross section view 4-4 of another embodiment of a tray for a tripod deer stand depicting a vertical and horizontal portion of the component frame with a component pan for that embodiment.
Figure 5:
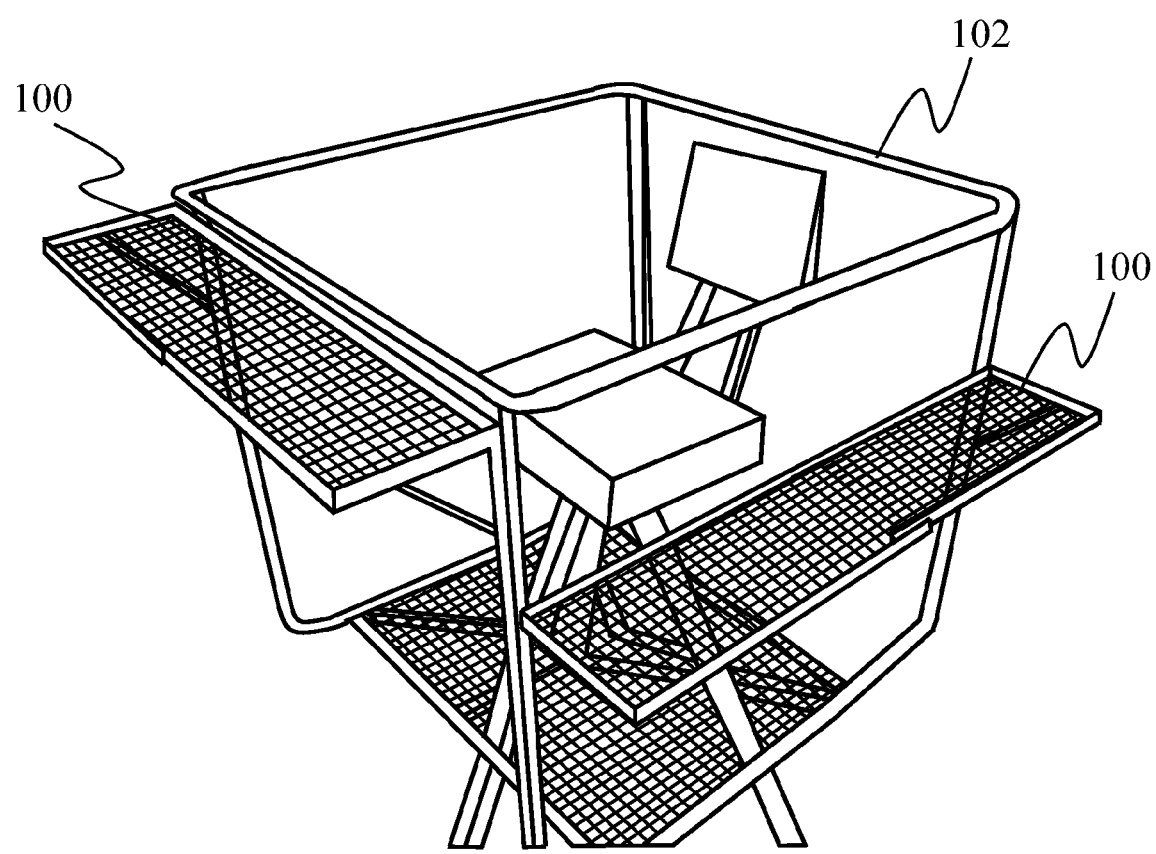
FIG. 5 is partial perspective view of one embodiment of a tray for a tripod deer stand attached in combination with a tripod deer stand.

Design Specifications:

The Components 110, 111:

As depicted in FIGS. 1A through 1D, 3, and 5, the tray 100 for the tripod deer stand 102 generally includes two components 110, 111 or two parts generally referred to as a first component 110 and a second component 111. Each component 110, 111 may include a frame 114, 115 and a pan 118, 119 such that the first component 110 includes a first component frame 114 and a first component pan 118 and the second component 111 includes a second component frame 115 and a second component pan 119. In one embodiment, the first component frame 114 may include a first component frame end portion 120, a first component frame front side portion 122, and a first component frame stand side portion 124, and the second component frame 115 may include a second component frame end portion 121, a second component frame front side portion 123, and a second component frame stand side portion 125. The first component frame 114 may include a first component frame vertical portion 130 and a first component frame horizontal portion 132, and the second component frame 115 may include a second component frame vertical portion 131 and a second component frame horizontal portion 133. As depicted in FIG. 1A, the first component 110 comprises a first component inside width 140 and the second component comprises a second component outside width 143. The first component inside width 140 is a dimension that identifies an inside dimension required for a second component outside width dimension to allow the second component 111 to fit within the first component 110. It may also be seen that the first component inside width 140 is a minimum dimension that identifies a dimension required for a second component outside width 143 to allow the second component 111 to fit within the first component 110. The first component inside width 140 is greater than the second component outside width 143 such that the second component 111 may transverse, slide, or move within the first component 110 such that the first component 110 may be adjusted in relation to the second component 111 to produce multiple desired overall tray widths 154 between a maximum width illustrated in FIG. 2C, and a minimum width illustrated in FIG. 2A dependent upon the dimensions of the first component length 146 and the second component length 147 and the first component vertical portion width 150 and the second component vertical portion width 151 for overall maximum width adjustments. An intermediate overall tray width is depicted in FIG. 2B. An embodiment may include a first component 110 and a second component 111 wherein the maximum width and the minimum width are the same or equal length. As depicted in FIGS. 1A, 3, and 4, in one embodiment, the first component pan 118 may be disposed within the first component vertical portion 130 and the first component pan 118 may be disposed with the first component frame horizontal portion 132. The second component pan 119 may be disposed within the second component vertical portion 131 and the second component pan 119 may be disposed with the second component frame horizontal portion 133. The component pans 118, 119 may be disposed with the horizontal portions of: the component frame end portions 120, 121, the component frame front side portions 122, 123, and the component frame stand side portions 124, 125. The component pans 118, 119 may be disposed within the vertical portions 130, 131 of the frame end portions 120, 121, the frame front side portions 122, 123, and the frame stand side portions 124, 125. The frame end portions 120, 121, the vertical portions of the frame front side portions 122, 123, and the frame stand side portions 124, 125 may be disposed outside of the component pans 118, 119 such that the maximum width adjustment is available for the overall tray width 154. In one embodiment, the component frame 114, 115 and pan 118, 119 may be manufactured as one item. One embodiment may include a one piece construction of the first component 110 wherein a metal sheet is stamped in the shape of the combined frame 114 and pan 118 wherein holes are punched in an area described in this description as the pan area. The second component 111 may also be constructed with this same type of stamp and punch one piece construction. In another embodiment, the component frame 114, 115 and pan 118, 119 may be manufactured with a separate frame and pan and then attached together. The first component 110 or the second component 111 manufacture material may include but is not limited to metal such as steel, stainless, aluminum, copper, or brass, composite, plastic, or molded plastic. The pan 118, 119 may include but is not limited to wire screen, wire mesh, perforated metal, and expanded metal with one embodiment including 1/16 inch expanded flattened steel. The pan 118, 119 may include metal screen wherein the metal screens may be attached with the metal angle frame. The metal screen may include numerous apertures that may be large enough to be used with the hardware to secure the first component 110 and the second component 111 together in numerous overall tray widths 154 such that maximum width adjustment is available for the overall tray width 154. The frame 114, 115 may include but is not limited to angles, angle irons, V-shapes, with one embodiment including 1/8 inch by 3/4 inch angle frame. In one embodiment, the pan 118, 119 may be attached with the frame 114, 115 by spot welding. A narrow component vertical portion of the metal angle frame allows for the maximum width adjustment for the overall tray width 154. Generally, the length of the first component 110 and the length of the second component 111 will be substantially the same to allow for the maximum adjustability of the overall tray width 154.

Figure 1C:
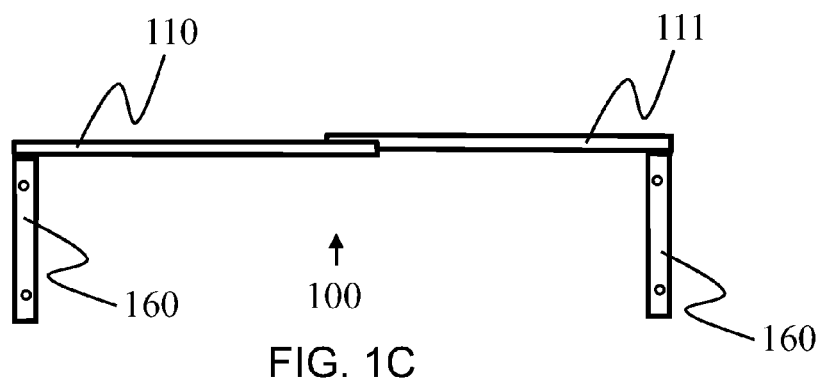
FIG. 1C is a stand side view of one embodiment of a tray for a tripod deer stand.
Figure 1D:
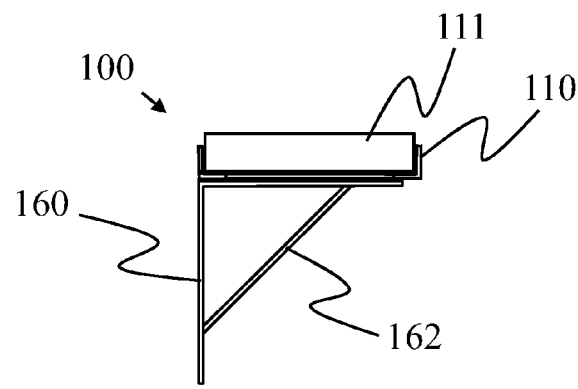
FIG. 1D is an end view of an embodiment of a tray for a tripod deer stand.

Support Brackets 160:

As shown in FIGS. 1C and 1D, in addition to the first component 110 and the second component 111, the tray 100 for the tripod deer stand further comprises at least two support brackets 160. Each support bracket 160 may comprise a generally vertical bracket portion and a generally horizontal bracket portion. A support brace 162 may be included between the generally vertical bracket portion and the generally horizontal bracket portion to increase the support bracket load capabilities for a heavier load. The at least two support brackets 160 may further include predrilled holes for assembly of the tray 100 with the deer stand. The support brackets 160 material for manufacture may include but is not limited to metal, composite, plastic, or molded plastic. The support brackets 160 in one embodiment may be 6½ inch by 3/4 inch by 1/8 inch metal strap configured at a ninety degree angle.

Hardware 180:

As illustrated in FIGS. 1D, 2A through 2C, and 5, the tray 100 for a tripod deer stand 102 further includes hardware 180 for securing the first component 110 with the second component 111 at a desired tray width, for securing the first and second component 110, 111 with the at least two support brackets 160, and for securing the at least two support brackets 160 with the tripod deer stand 102. The hardware may include numerous means of attachment and securing. One example of one embodiment may include but is not limited to hardware that may be 1¼ inch by ¼ inch bolts, 1 inch by ¼ inch bolts, fender washers, lock washers, and nuts.

Other Features:

As shown in FIGS. 1A through 1D, and 5, in one embodiment, the tray 100 for the tripod deer stand 102 that includes the first component 110, the second component 111, and the brackets 160 may further include a powder coat finish Powder coat finish. In another embodiment, the tray 100 for the tripod deer stand 102 may also include a camouflage finish similar to the tripod deer stand 102 that may be used with the tray 100.

Combination:

As depicted in FIGS. 1A through 1D, and 5, the tray 100 is used in combination with a tripod deer stand 102. The tray 100 for the tripod deer stand may be secured with the tripod deer stand 102 with at least two support brackets 160 using hardware 180 for securing the first component 110 with the second component 111 for the desired overall tray width, with the hardware 180 securing the first and second component 110, 111 with the at least two support brackets 160, and with the hardware 180 securing the at least two support brackets 160 with the tripod deer stand 102. The tray 100 may be installed and removed for transportation of the tray 100 and or the transportation of the tripod deer stand 102.

Kit:

As illustrated in FIGS. 1A through 1D, FIGS. 2A through 2C, and 5, a kit for a tray 100 for a tripod deer stand 102 wherein the kit includes: two components 110, 111 wherein the first component 110 comprises an inside width 140 and the second component 111 comprises an outside width 143, wherein the first component 110 inside width 140 is greater than the second component 111 outside width 143 such that the second component 111 may slide within the first component 110, and wherein the first component 110 is adjusted in relation to the second component 111 to multiple desired overall tray widths between a maximum width FIG. 2C and a minimum width FIG. 2A based on the first component 110 and the second component 111 dimensions; at least two support brackets 160; and hardware 180 for securing the first component 110 with the second component 111 for the desired overall tray width, for securing the first and second component 110, 111 with the at least two support brackets 160, and for securing the at least two support brackets 160 with the tripod deer stand 102.

What is claimed is:

1. A tray for a tripod deer stand, the tray comprising:
   a first component wherein the first component comprises a first component inside width, a first component frame, and a first component pan; and
   a second component wherein the second component comprises a second component outside width, a second component frame, and a second component pan, wherein the first component frame and the second component frame each comprise a vertical portion and a horizontal portion, wherein the first and second component pans are disposed with the first and second component frame horizontal portions and wherein the first and second component frame vertical portions are disposed outside of the first and second component frame pans such that maximum width adjustment is available for the overall tray width wherein the first component inside width is greater than the second component outside width such that the second component may slide within the first component, and wherein the first component is adjusted in relation to the second component to multiple desired overall tray widths between a maximum width and a minimum width based on the first component and the second component dimensions;
   at least two support brackets; and
   hardware for securing the first component with the second component for the desired overall tray width, for securing the first and second component with the at least two support brackets, and for securing the at least two support brackets with the tripod deer stand; wherein the first and second component pans include numerous apertures having a structure of multiple columns and rows wherein the column alignment is offset from row to row such that aperture alignment is varied as the tray width increases and decreases and wherein the apertures are large enough for the hardware to pass through the apertures and to secure the first component and the second component together at numerous overall tray widths wherein the first and second component pan numerous apertures are aligned and the hardware for securing the first component with the second component comprises bolts, washers, and nuts used to secure the desired width wherein the bolts are inserted through aligned apertures such that the maximum width adjustment is available for the overall tray width.

2. The tray as set forth in claim 1, wherein the at least two support brackets each comprise a generally vertical bracket portion and a generally horizontal bracket portion, and a support brace between the generally vertical bracket portion and the generally horizontal bracket portion wherein the support brace is attached with the vertical bracket portion and with the horizontal bracket portion such that the at least two support brackets supports a heavier load.

3. The tray as set forth in claim 1, wherein the first component, the second component, and the brackets include a powder coat finish.

4. The tray as set forth in claim 1, wherein the first component comprises a one piece construction wherein a metal sheet is stamped in the shape of the first component and wherein the second component comprises a one piece construction wherein a second metal sheet is stamped in the shape of the second component; wherein the numerous apertures are punched in a pan area of the first component and the second component providing the numerous apertures to allow the bolts, the washers, and the nuts to pass through the apertures that align when the first and second component are disposed together at the desired length to secure the first component and the second component together in numerous overall tray widths.

5. The tray as set forth in claim 1, in combination with the tripod deer stand.

6. The tray as set forth in claim 1;
   wherein the first component frame and the second component frame each comprise a component frame end portion, a component frame front side portion, and a component frame stand side portion, wherein the component frame end portions, the component frame front side portions, and the component frame stand side portions comprise the vertical portion and the horizontal portion, wherein the component pans are disposed with the component frame horizontal portions of the component frame end portions, the component frame front side portions, and the component frame stand side portions, and wherein the component frame vertical portions of the component frame end portions, the component frame front side portions, and the component frame stand side portions are disposed outside of the component frame pans such that maximum width adjustment is available for the overall tray width.

7. The tray as set forth in claim 6, wherein the at least two support brackets further include predrilled holes for assembly of the tray with the deer stand, wherein the hardware includes bolts, fender washers, lock washers, and nuts for attaching the bracket with the tray and the stand.

8. The tray as set forth in claim 6;
   wherein the first component frame of the first component and the second component frame of the second component each comprises a metal angle component frame wherein the vertical portion of the metal angle component frame is narrow allowing the maximum width adjustment for the overall tray width; and
   wherein the first component pan of the first component and the second component pan of the second component each comprises a metal screen wherein the metal screens are attached with the metal angle component frame, wherein the metal screen is numerous apertures large enough for the hardware bolts to pass through to secure the first component and the second component together in numerous overall tray widths such that the maximum width adjustment is available for the overall tray width.

9. The tray as set forth in claim 8, wherein the metal screen is expanded flattened steel $\frac{1}{16}$ inch thick wherein the metal screen attachment with the metal angle component frame includes spot welding.

10. The tray as set forth in claim 9, wherein the at least two support brackets each comprise a generally vertical bracket portion and a generally horizontal bracket portion, and a support brace between the generally vertical bracket portion and the generally horizontal bracket portion wherein the support brace is attached with the vertical bracket portion and with the horizontal bracket portion such that the at least two support brackets supports a heavier load, wherein the at least two support brackets further include predrilled holes for assembly of the tray with the deer stand, wherein the hardware includes bolts, washers, lock washers, and nuts for attaching the bracket with the tray and the stand, wherein the first component, the second component, and the brackets include a powder coat finish.

11. A tray for a tripod deer stand comprising:
- a first component wherein the first component comprises a first component inside width, a first component frame, and a first component pan; and
- a second component wherein the second component comprises a second component outside width, a second component frame, and a second component pan, wherein the first component frame and the second component frame each comprise a vertical portion and a horizontal portion, wherein the component pans are disposed with the component frame horizontal portions, and wherein the component frame vertical portions are disposed outside of the component frame pans such that maximum width adjustment is available for the overall tray width wherein the first component inside width is greater than the second component outside width such that the second component may slide within the first component, and wherein the first component is adjusted in relation to the second component to multiple desired overall tray widths between a maximum width and a minimum width based on the first component and the second component dimensions;
- at least two support brackets; and
- hardware for securing the first component with the second component for the desired overall tray width, for securing the first and second component with the at least two support brackets, and for securing the at least two support brackets with the tripod deer stand; wherein the first component pan of the first component and the second component pan of the second component each comprises a molded plastic screen and the first component frame and the second component frame each comprise molded plastic component frames wherein the molded plastic screens are attached with the molded plastic component frame, wherein the molded plastic screen includes numerous apertures having a structure of multiple columns and rows wherein the column alignment is offset from row to row such that aperture alignment is varied as the tray width increases and decreases and wherein the apertures are large enough for the first and second component securing hardware comprising bolts, washers, and nuts to secure the first component and the second component together in numerous overall tray widths by inserting the bolts through the apertures in the first and second component pans that align within the first and second components at the desired width and securing the desired width such that the maximum width adjustment is available for the overall tray width.

* * * * *